United States Patent [19]

Shinoda et al.

[11] Patent Number: 4,833,726
[45] Date of Patent: May 23, 1989

[54] HELMET WITH TWO-WAY RADIO COMMUNICATION FACULTY

[75] Inventors: Katsuro Shinoda, Nagoya; Toshiyuki Kawaguchi, Inuyama; Hiroyuki Katsukawa, Niwa; Naoki Tanaka, Komaki, all of Japan

[73] Assignee: NGK Insulators, Ltd., Japan

[21] Appl. No.: 20,954

[22] Filed: Mar. 2, 1987

[30] Foreign Application Priority Data

| Mar. 7, 1986 | [JP] | Japan | 61-51084 |
| Aug. 15, 1986 | [JP] | Japan | 61-191926 |
| Dec. 5, 1986 | [JP] | Japan | 61-291351 |

[51] Int. Cl.[4] .............................................. H04B 1/38
[52] U.S. Cl. .................................... 455/89; 455/90; 455/351; 381/183
[58] Field of Search ............... 455/89, 90, 351, 95, 455/128, 127; 338/68; 2/422–425; 379/428, 430–431; 381/111–114, 122, 169, 183

[56] References Cited

U.S. PATENT DOCUMENTS

| 4,109,105 | 8/1978 | Von Statten, Jr. | 455/351 |
| 4,130,803 | 12/1978 | Thompson | 455/351 |
| 4,152,553 | 5/1979 | White | 381/113 |
| 4,321,433 | 3/1982 | King | 455/351 |
| 4,357,711 | 11/1982 | Drefko et al. | 455/351 |
| 4,524,461 | 6/1985 | Kostanty et al. | 455/79 |
| 4,607,395 | 8/1986 | Sundahl | 455/89 |

FOREIGN PATENT DOCUMENTS

| 936921 | 7/1971 | Canada. |
| 1157662 | 11/1963 | Fed. Rep. of Germany. |
| 7736284 | 3/1978 | Fed. Rep. of Germany. |
| 2368835 | 5/1978 | France. |
| 2526641 | 11/1983 | France ................. 455/89 |
| 2063619 | 11/1980 | United Kingdom. |

Primary Examiner—Robert L. Griffin
Assistant Examiner—Curtis Kuntz
Attorney, Agent, or Firm—Arnold, White & Durkee

[57] ABSTRACT

A helmet with two-way radio communication faculty including a cap-like outer shell made of hard and electrically insulating plastic material, a cap-like shock absorbing member arranged within the outer shell, an ear-pad member secured to one side edge of the outer shell, a transmitter unit arranged in a top recess formed in an outer surface of the shock absorbing member at its top portion, a receiver unit arranged on an inner surface of the ear-pad member, a battery unit arranged in a side recess formed in the outer surface of the shock absorbing member at its side which is opposite to a side on which the ear-pad member is secured to the outer shell, a transmitting dipole antenna made of a metal foil secured on an inner surface of the outer shell at its one side with the aid of an electrically insulating adhesive tape, and a receiving dipole antenna made of a metal foil secured on the inner surface of the outer shell at its other side with the aid of an electrically insulating adhesive tape.

41 Claims, 14 Drawing Sheets

FIG._4A
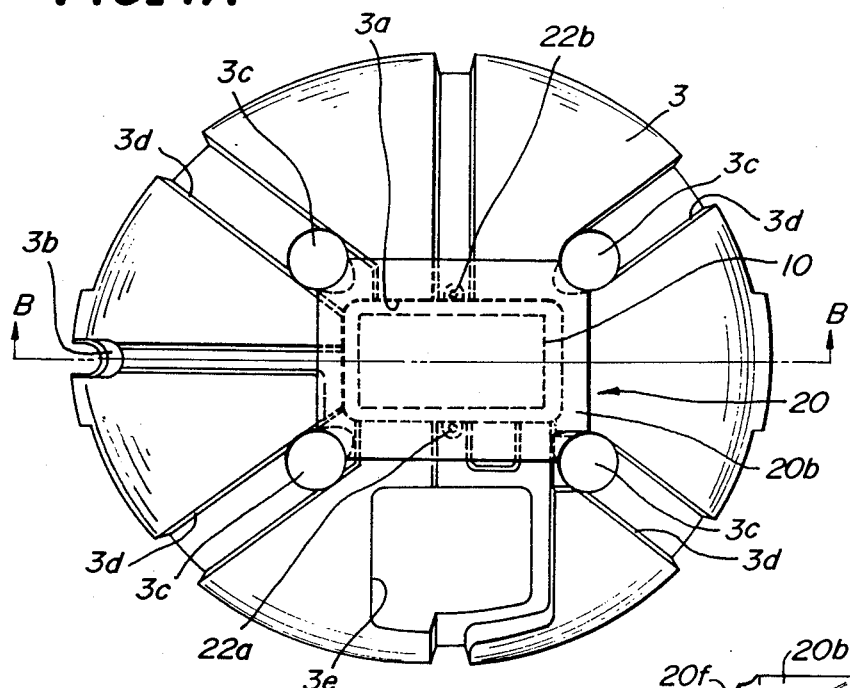
FIG._4B
FIG._4C
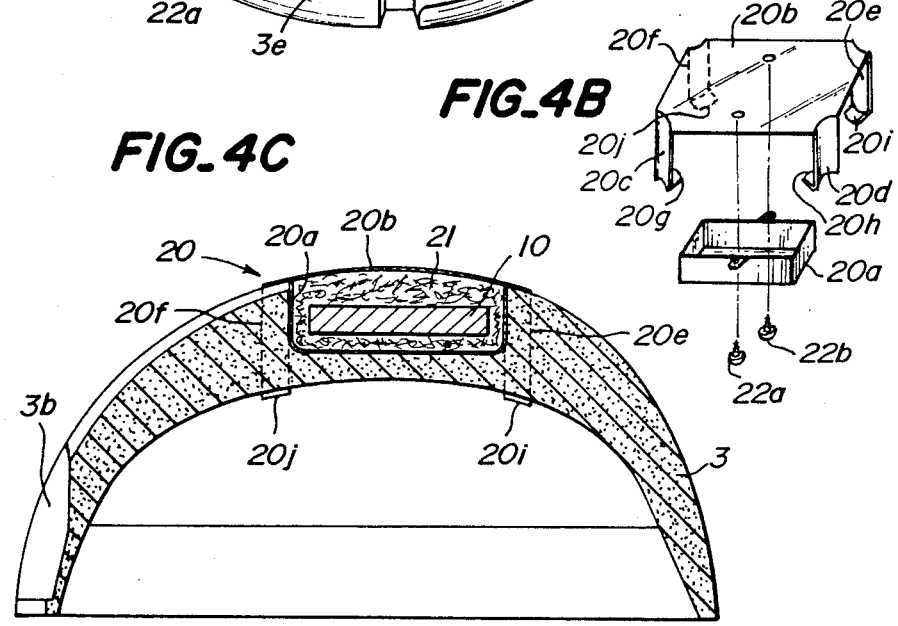

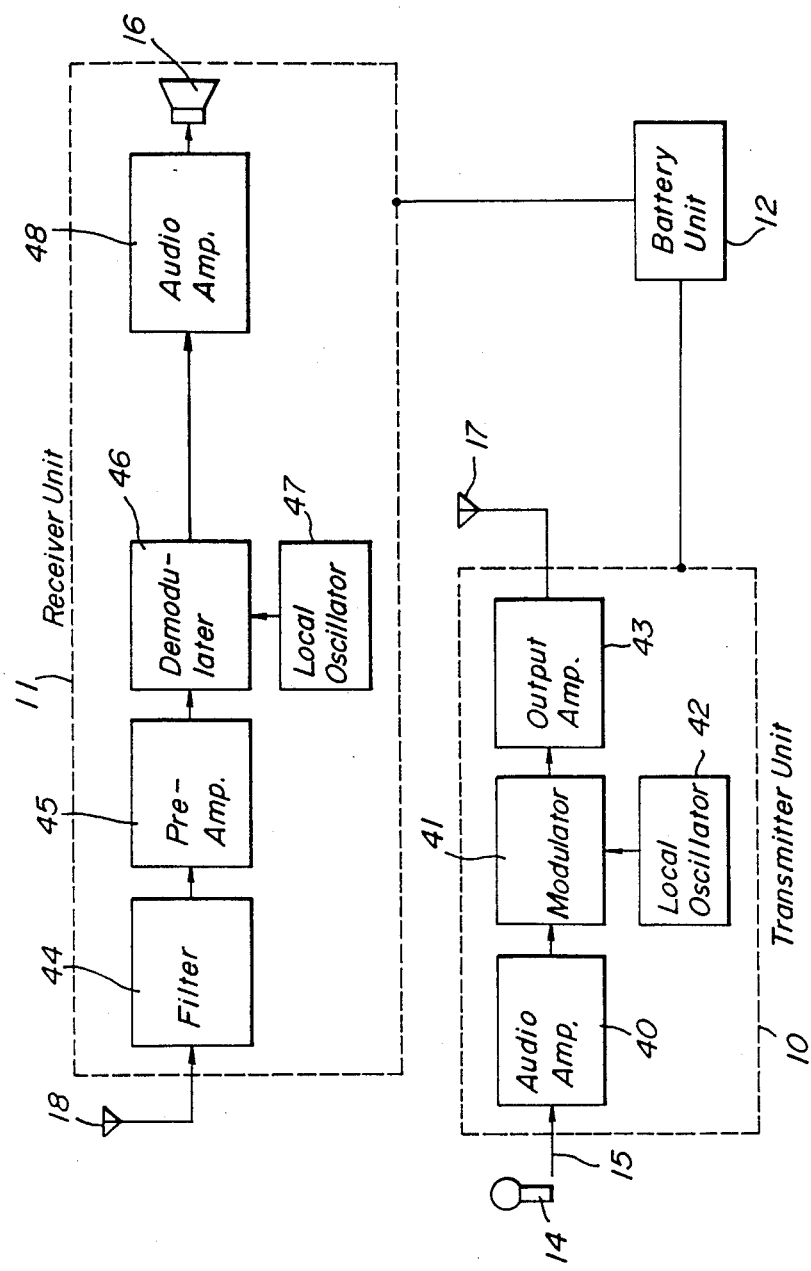

FIG._13A
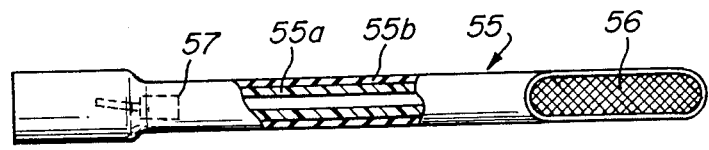
FIG._13B
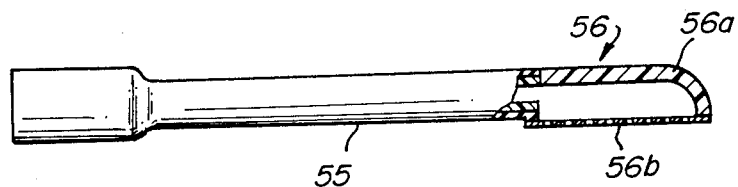
FIG._14
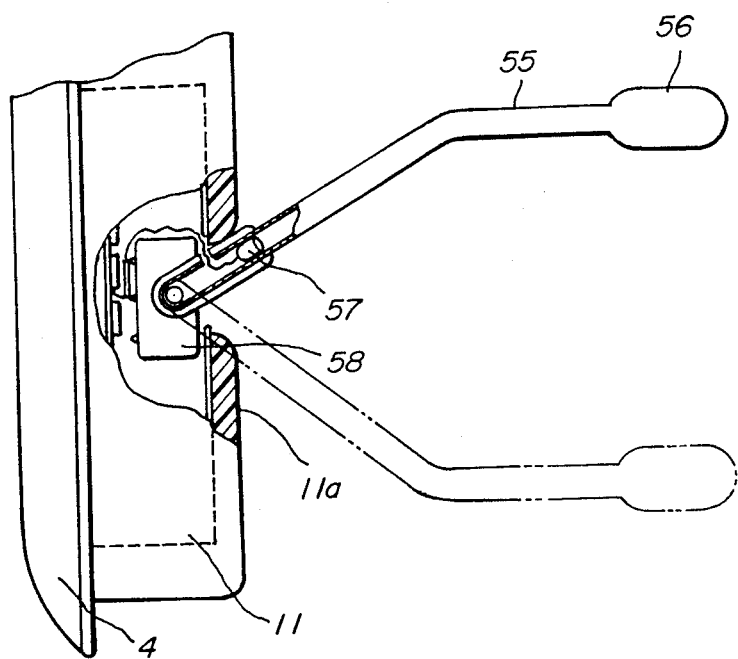

HELMET WITH TWO-WAY RADIO COMMUNICATION FACULTY

BACKGROUND OF THE INVENTION

Field of the Invention and Related Art Statements

The present invention relates to a helmet with two-way radio communication faculty.

Such helmets can be advantageously used by workers who work within constructions such as underground electric power substations, buildings, underground streets and work at high points of power transmission towers and power distribution poles and general outdoor workings. With the aid of the helmets with two-way radio communication faculty, not only communication between workers who wear helmets, but also between workers and a supervisor or central control room can be effected.

The helmet with two-way radio communication faculty has been known and described in, for instance Canadian Patent No. 936,921 issued on Nov. 13, 1973. In this known helmet, a transmitter unit, a receiver unit and a battery unit are all arranged in a box-like housing and the housing is secured to an inner surface of a cap-like outer shell. Further an antenna is provided on an outer surface of the outer shell. In such a known helmet, since almost all components are arranged in the box-like housing dimension of the housing is liable to be large and weight of the helmet is liable to be heavy. Therefore, it is necessary to provide a relatively large space within the outer shell, so that the helmet becomes large. Further, the weight of the helmet is concentrated at its center, a user wearing the helmet feels weariness and a working efficiency of user might be decreased. Moreover, in this known helmet, the transmitter and receiver units are arranged in the same box-like housing, radio frequency energy might be supplied from the transmitter unit to the receiver unit to cause interference. Further, the known helmet has no shock absorbing member underneath the outer shell, and impermissible mechanical shock might be transferred to a head of the user.

Further, in the known helmet, since the antenna is provided on the outer surface of the outer shell, the antenna conductor might be easily exposed although the antenna is embedded in an electrically insulating plastic strip. Then the helmet could not be effectively protected against the electric shock under a high tension.

SUMMARY OF THE INVENTION

The present invention has for its object to provide a novel and useful helmet with the two-way radio communication faculty which can obviate the above mentioned drawbacks of the known helmet.

According to the invention, a helmet with two-way radio communication faculty comprises a cap-like outer shell made of hard and electrically insulating material;

an ear-pad member made of hard and electrically insulating material and secured to said outer shell at its one side edge;

a cap-like shock absorbing member made of electrically insulating and shock absorbing material, said shock absorbing member being arranged within said outer shell and having a plurality of recesses formed in an outer surface thereof;

a sound converting means for converting sound into an audio signal;

a transmitter unit for converting said audio signal into a high frequency signal;

a transmitting antenna for transmitting said high frequency signal as electromagnetic waves;

a receiving antenna for receiving electromagnetic waves transmitted from other transmitting antennas to regenerate a high frequency signal therein;

a receiver unit for receiving said high frequency signal regenerated in said receiving antenna and generating an audio signal;

a sound reproducing means for receiving said audio signal generated by said receiver unit and reproducing sound; and a battery unit for energizing said transmitter unit and receiver unit; whereby one of said transmitter unit, receiver unit and battery unit is provided on an inner surface of said ear-pad member and the remaining units are arranged separately in said recesses formed in the outer surface of the shock absorbing member and said transmitting antenna and receiving antenna are secured to an inner surface of said outer shell.

The present invention further relates to a two-way radio communication system with a helmet which can be easily carried by a user.

According to the invention, a two-way communication system with a helmet having a hard and electrically insulating outer shell and a hard and electrically insulating ear-pad member secured to one side edge of the outer shell, comprises a housing means for accommodating a transmitter unit, receiver unit, a battery unit, a transmitting antenna and a receiving antenna;

a sound reproducing means arranged on an inner surface of the ear-pad member for generating sound;

a sound collecting means secured to the helmet for collecting sound;

a first communication cable means for coupling the sound reproducing means with the receiver unit; and a second communicating means for coupling the sound collecting means with the transmitter unit.

BRIEF DESCRIPTION OF THE DRAWINGS

FIG. 4A is a plan view showing a manner of fixing a transmitter unit in a top recess of the shock absorbing member, FIG. 4B is a cross sectional view cut along a line B—B in FIG. 4A and FIG. 4C is an exploded perspective view illustrating a housing for the transmitter unit;

FIG. 10 is a block diagram showing a construction of transmitter and receiver units;

FIGS. 13A and 13B are partially cross sectional views showing a sound collecting means shown in FIG. 12;

FIG. 14 is a partially cross sectional view showing a switch actuated by the sound collecting means shown in FIG. 12.

EXPLANATION OF THE PREFERRED EMBODIMENTS

Figure 1:
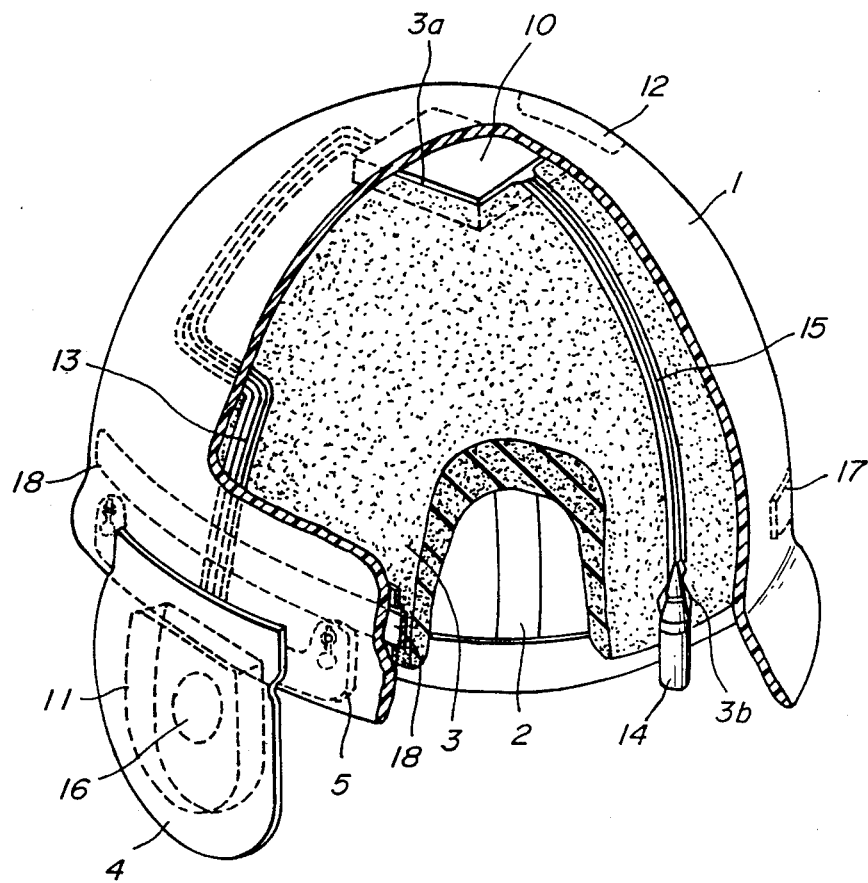
FIG. 1 a partially cut-away perspective view showing an embodiment of the helmet according to the invention.
Figure 2A:
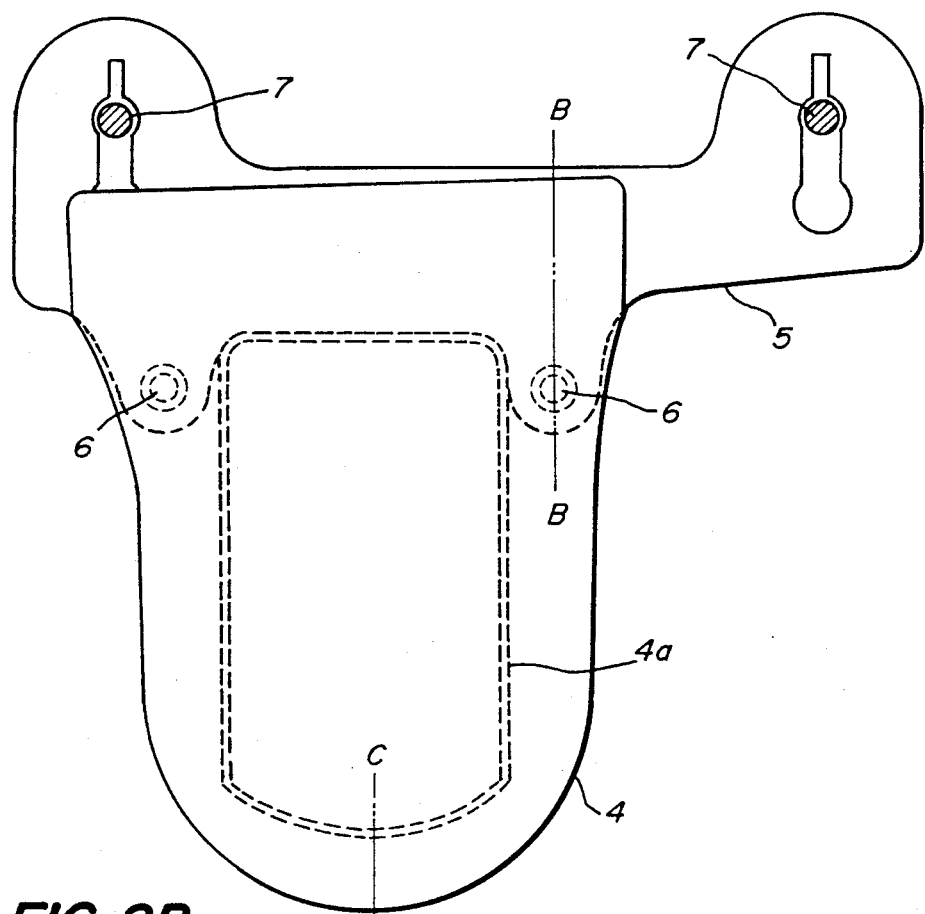
FIG. 2A is a plan view illustrating an ear-pad member shown in FIG. 1, and FIGS. 2B and 2C are cross sectional views cut along lines B—B and C—C, respectively, in FIG. 2A.
Figure 2B:
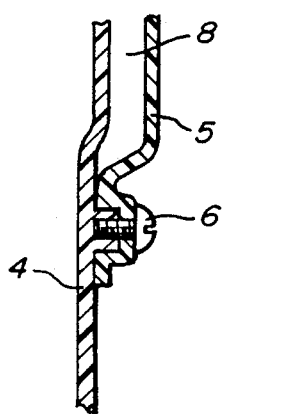
Figure 2C:
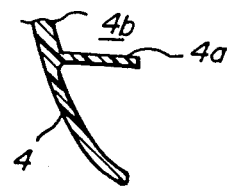

FIG. 1 is a partially cut away perspective view showing an embodiment of the helmet according to the invention. The helmet comprises a cap-like outer shell 1 made of hard and electrically insulating material. The outer shell 1 is preferably made of hard plastics such as polycarbonate, polyethylene, vinyl chloride resin, epoxy resin and urethane resin or FRP (fiber reinforced plastics). Inside the outer shell 1 is arranged a hammock-like supporting member 2 for fixing the helmet on a head of a user. In a space formed between the outer shell 1 and the supporting member 2 is arranged a cap-like shock absorbing member 3 made of shock absorbing material such as foamed polystyrene resin. To a periphery of the outer shell 1 is secured an ear-pad member 4. The ear-pad member 4 may be made of the same material as the outer shell 1. The thickness of the outer shell 1 and ear-pad member 4 may be about 2 mm. As shown in FIGS. 2A and 2B, the ear-pad member 4 is secured to an elastic fitting member 5 by means of screws 6, and the fitting member 5 is then secured to the outer shell 1 by means of rivets 7 which are provided for securing the hammock-like supporting member 2 to the outer shell 1. The fitting member 5 may be made of electrically insulating elastic material such as polyethylene, polycarbonate and vinyl chloride resin. As illustrated in FIG. 2B, there is formed a slit-like space 8 between the ear-pad member 4 and the fitting member 5, and a lower edge of the outer shell 1 is inserted into said space 8. It is noted that by using the above mentioned fitting member 5 it is possible to connect the ear-pad member 4 to any existing helmets without changing or altering the construction of the helmets, so that the helmet according to the invention could be realized at a minimum cost. FIG. 2C is a partial cross section cut along a line C—C in FIG. 2A. In an inner surface of the ear-pad member 4 is integrally formed a ridge 4a which surrounds a space 4b in which a receiver unit is installed as will be explained later. By providing such a ridge 4a, a distance measured along a surface from the receiver unit to a periphery of the ear-pad member 4 can be increased, so that the electrical insulation can be enhanced. In the present embodiment, by providing said ridge 4a, the distance along the surface can be made more than 30 mm.

As shown in FIG. 1, at a top of the cap-like shock absorbing member 3 there is formed a rectangular recess 3a and a transmitter unit 10 is fitted therein. As explained above, the receiver unit 11 is arranged in the space 4b formed in the inner surface of the ear-pad member 4. At a side portion of the shock absorbing member 3 which is opposite to a side portion on which the ear-pad member 4 is provided, there is further formed a rectangular recess and a battery unit 12 for energizing the transmitter unit 10 and receiver unit 11 is installed. The transmitter unit 10, receiver unit 11 and battery unit 12 are electrically connected with each other by means of electric conductors some of which are shown in FIG. 1 by a reference numeral 13. It should be noted that these conductors 13 are fitted into a groove formed in the outer surface of the shock absorbing member 3. There is further provided a small microphone 14 which is clamped into a slit-like recess 3b formed in the shock absorbing member 3 at its forehead edge portion. In order to attain a sufficient electrical insulation, it is preferable to arrange the microphone 14 such that its front end is retarded from the lower edge of the outer shell 1 by 30 mm to 50 mm. The microphone 14 has preferably a narrow directional property. The microphone 14 is connected to the transmitter unit 10 via electric conductors 15 which are also fitted into a groove formed in the outer surface of the shock absorbing member 3. As schematically shown in FIG. 1, the receiver unit 11 comprises a small speaker 16 for reproducing a received audio signal. When a user wears the helmet, the speaker 16 is positioned just in front of the right hand ear of the user and thus the user can listen clearly to the sound reproduced by the speaker 16.

The helmet of the present embodiment further comprises a transmitting antenna 17 for emitting radio-frequency electrical energy supplied from the transmitter unit 10, and a receiving antenna 18 for receiving radio-frequency electrical energy transmitted from a transmitter unit of another helmet or a transmitting antenna provided in a section in which the user situates. The transmitting antenna 17 is connected to the transmitter unit 10 via a coaxial cable which is fitted in a groove formed in the outer surface of the shock absorbing member 3. Similarly the receiving antenna 18 is connected to the receiver unit 11 via a coaxial cable fitted in a groove formed in the outer surface of the shock absorbing member 3. In the present embodiment, the transmitting and receiving antennas 17 and 18 are made of metal foils and are secured on an inner surface of the outer shell 1 with the aid of adhesive tapes. Each of the antennas 17 and 18 is preferably designed as a dipole antenna having an antenna length of a half wavelength. A ratio of width to length of the dipole antenna is preferably set within a range of 0.02 to 0.1. When the antenna is provided inside the helmet, the antenna situates very close to the head of the user, so that its capacitance is liable to increase. Therefore, the reactance of the antenna has to be decreased in order to attain the tuning in a high frequency range of 300 to 400 MHz. In case of using the stripe-shaped antenna, the reactance can be reduced by decreasing the width with respect to the length. The inventors of the instant application have confirmed experimentally that by setting the ratio of the width to the length of the antenna within the above mentioned range of 0.02 to 0.1, the good result could be attained. If said ratio is made smaller than 0.02, it is difficult to obtain the tuning to a sufficient extent and the gain of the antenna is decreased and the receiving sensitivity is lowered. If the ratio is set beyond 0.1, a surface area of the antenna becomes too large to attain the good tuning, because the capacitance between the antenna and the head of the user becomes very large. Further, in order to provide the antennas 17 and 18 on the curved surface of the outer shell 1, they are formed by a flexible foil made of copper, aluminum or brass. In order to reduce the weight of the whole helmet as far as possible, the thickness of the antenna foil is preferably made less than 0.5 mm. As stated above, the antennas 17 and 18 are connected to the transmitter unit 10 and receiver unit 11, respectively by means of the coaxial cables. It should be noted that the coaxial cable connected to the transmitting antenna 17 has preferably a length substantially equal to a half wavelength. Since the length of the coaxial cable connected to the receiving antenna 18 is shorter than that of the coaxial cable connected to the transmitting antenna 17, reactance elements are connected to the former coaxial cable so as to attain the impedance matching. Since the antennas 17 and 18 are provided on opposite sides of the outer shell 1, their coaxial cables are not crossed with each other. Since the antenna foil made of copper, aluminum or brass is liable to rust in a high humidity condition within the helmet, the antenna is covered with a high molecular film made of silicone resin, polyethylene resin, epoxy resin or polypropylene resin.

In the helmet according to the invention, the transmitter and receiver units 10 and 11 are separated from each other and the transmitting and receiving antennas 17 and 18 are also separated from each other, so that the interference between the transmitter unit and the receiver unit can be minimized.

Further, the reactance of the antenna may be reduced by arranging the antenna in a zigzag manner along a circumference of the helmet.

In the present embodiment, since the heaviest battery unit 12 is provided on an opposite side of the helmet to that on which the ear-pad member 4 is provided, the good weight balance can be achieved, so that the user hardly feels the wearsome although he wears the helmet for a long time.

Figure 3A:
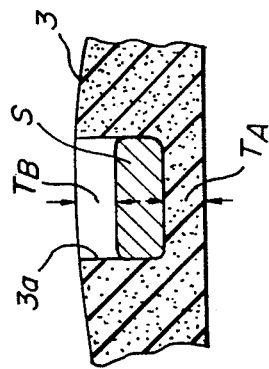
FIGS. 3A, and 3B are cross sectional view and graph depicting an experiment for confirming the property of a shock absorbing member shown in FIG. 1.
Figure 3B:
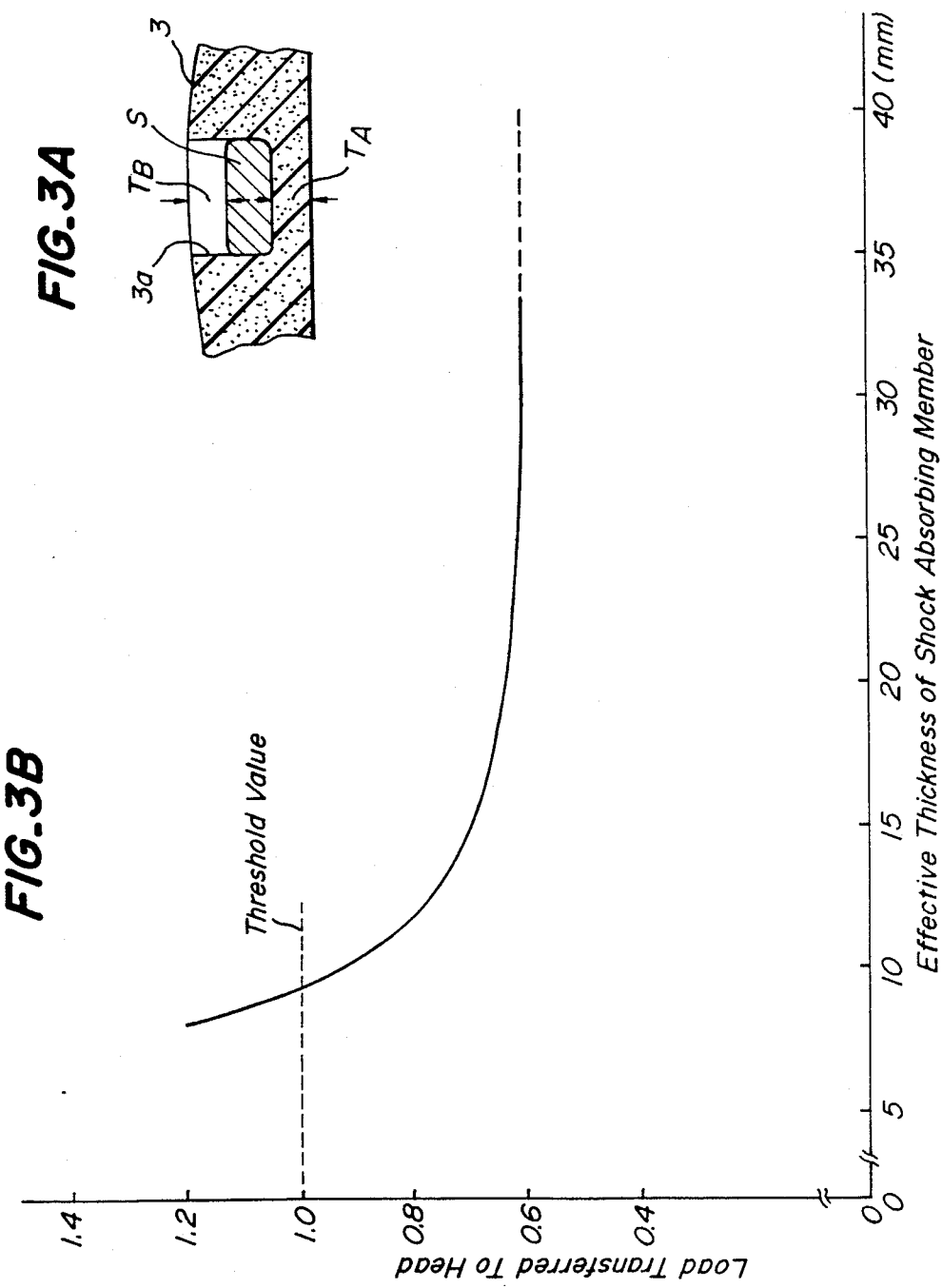

In the present embodiment, the transmitter unit 10 is provided in the rectangular top recess 3a formed in the outer surface of the shock absorbing member 3 at its top, so that the shock absorbing member 3 has a large thickness of 30 to 55 mm at its top in order to absorb a mechanical shock effectively. According to a safety standard for helmet, after the helmet is immersed into water of 25° C.±5° C. for more than four hours or after the helmet is kept at temperatures of 50° C.±2° C. and −10° C.±2° C. for more than two hours, when a flat shape striker having a weight of 5 kg is dropped on the helmet from a point one meter high, a load more than 1,000 kg should not be transferred to a head of a user, and loads more than 750 kg and 500 kg should not last for 3 ms and 4.5 ms, respectively. In order to satisfy such a requirement, the shock absorbing member should have a sufficient thickness. In the present embodiment, in order to fit the transmitter unit 10 in the top of the shock absorbing member 3, the top recess 3a is formed in the shock absorbing member, so that its efficiency might be decreased. In order to confirm the shock absorbing property of the member 3, the inventors conducted the following experiment. As illustrated in FIG. 3A, the recess 3a was formed in the shock absorbing member 3 at its top and a hard sample S was fitted in the recess. Then the flat-shaped striker was dropped on the shock absorbing member 3, and a load transferred to a neck portion of a dummy head was measured with the aid of a load cell. The result of this experiment is shown in FIG. 3B, in which an axis of abscissae represents an effective thickness of the shock absorbing member and an axis of coordinates denotes a load transferred to the head of the user in an arbitrary unit. That is to say, the load is normalized with respect to the maximum admissible load, i.e. threshold value. The effective thickness of the shock absorbing member can be defined as a sum of a thickness $T_A$ of the actual material at the recess 3a and a distance $T_B$ from a top surface of the member 3 to a top surface of the sample S, because these two dimensions $T_A$ and $T_B$ can effectively serve to absorb the shock.

From a graph shown in FIG. 3B, it can be confirmed that the effective thickness is preferably set within a range of 9 mm to 25 mm. Therefore, the thickness of the transmitter unit 10 has to be set to a value within a range of about 5–45 mm. According to the well developed electronic field of art, such a requirement can be satisfied easily.

Further according to the invention, the two-way communication apparatus is divided into several units and these units are provided at different positions within the helmet. Therefore, the electromagnetic interference between these units can be effectively reduced. This results in that the circuit arrangement of these units can be made simple accordingly so that the dimension of these units can be reduced. Therefore, the recesses formed in the outer surface of the shock absorbing member for accommodating these units can be made small, and the shock absorbing property of the member 3 is not substantially deteriorated.

FIGS. 4A, 4B and 4C illustrate the manner of fitting the transmitter unit 10 in the top recess 3a of the shock absorbing member 3. In order to effect the ventilation, in the shock absorbing member 3 there are formed four through holes 3c near the top thereof and a plurality of grooves 3d communicated with the holes. In the present embodiment, the transmitter unit 10 is first installed in a box-like member 20, and the box-like member 20 is then secured to the shock absorbing member 3 by utilizing said holes 3c. As shown in FIG. 4c, the box-like member 20 comprises a housing 20a and a top plate 20b having four legs 20c–20f each having lags 20g–20j. After the transmitter unit 10 is inserted in the housing 20a together with cushion material 21, the housing 20a is secured to a rear surface of the top plate 20b by means of screws 22a and 22b. Then the lags 20c–20f of the top plate 20b are inserted into the ventilation holes 3c of the shock absorbing member 3 to such an extent that the legs 20g–20j are projected over the inner surface of the shock absorbing member 3. The cushion material 21 may be made of soft resin such as foamed styrol. The housing 20a and top plate 20b may be formed by an elastic sheet having a thickness of about 1 mm and being made of polyethylene, polycarbonate and acrylic resin. In this manner, the box-like member 20 can be made light in weight and can be detachably secured to the shock absorbing member 3 in an easy and effective manner. In FIG. 4A, the recess 3b for accommodating the microphone 14 and the side recess 3e for accommodating the battery unit 12 are shown clearly.

Figure 5A:
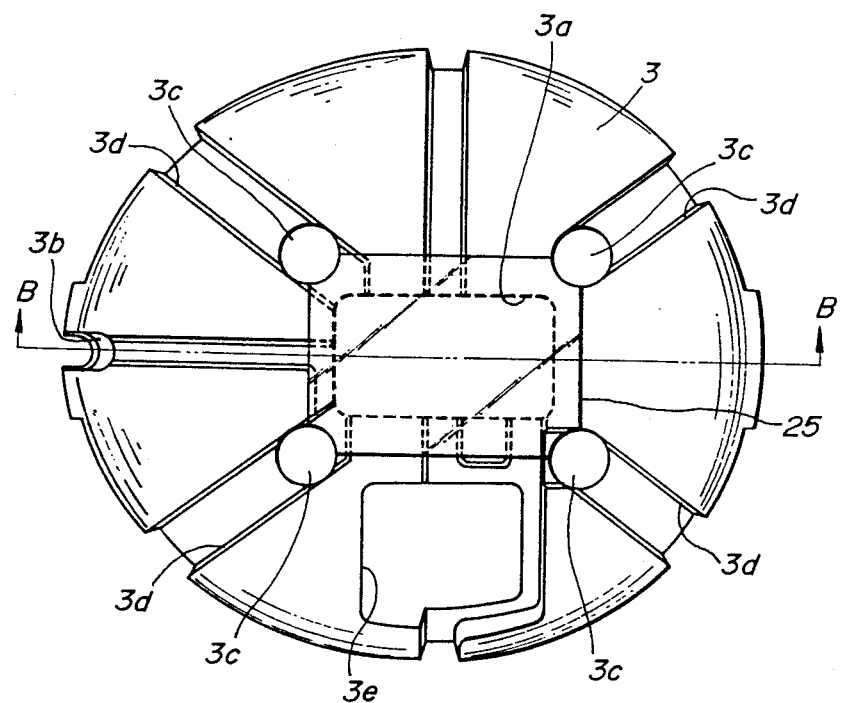
FIG. 5A is a plan view showing another method of fitting the transmitter unit in the top recess.
Figure 5B:
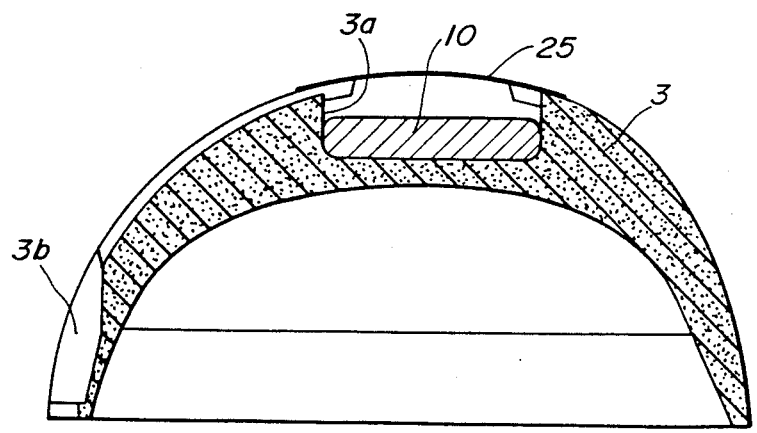
FIG. 5B is a cross sectional view cut along a line B—B in FIG. 5A.

FIGS. 5A and 5B show another embodiment of the helmet according to the invention, in which portions similar to those shown in FIGS. 4A and 4B are denoted by the same reference numerals used in FIGS. 4A and 4B.

In the present embodiment, the transmitter unit 10 is firmly clamped into the recess 3a and an opening of the recess is closed by a plastic film 25 having an adhesive coating applied thereto. In such a construction, the weight can be made a minimum.

Figure 6:
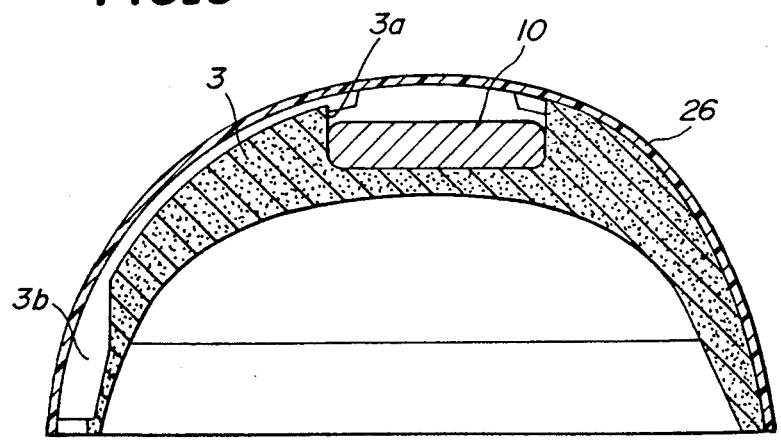
FIG. 6, is a cross sectional view representing still another method of fitting the transmitter unit in the top recess.

FIG. 6 is a cross sectional view showing still another embodiment of the helmet according to the invention. In the present embodiment, after the transmitter unit 10, battery unit 12, conductors and cables are placed in position on the shock absorbing member 3, the whole outer surface of the shock absorbing member 3 is covered with a heat-shrinkable plastic film 26, and then the film is heated to be secured to the member 3.

Figure 7:
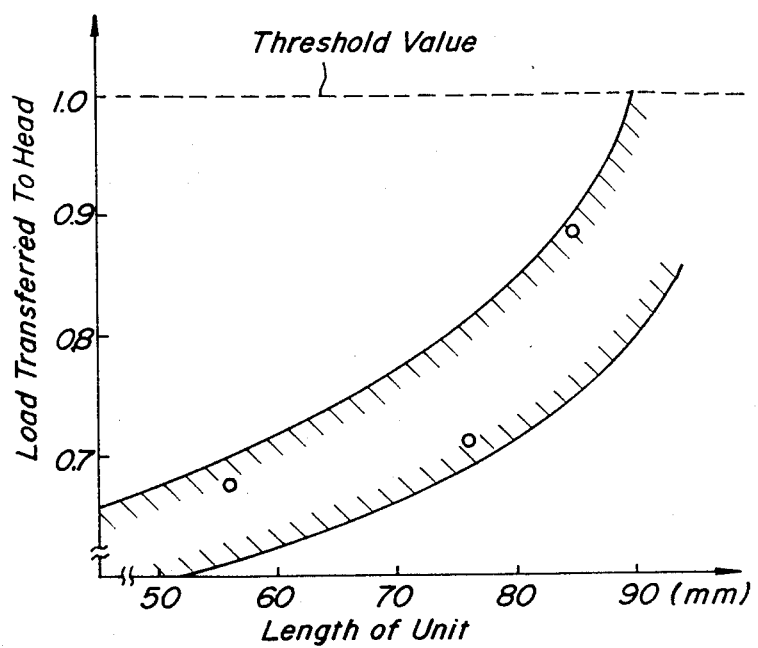
FIG. 7 is a graph depicting a relationship between the length of the transmitter unit and the load transferred to the head of the user.

FIG. 7 is a graph representing a relationship between the length of the transmitter unit 10 installed in the top recess 3a of the shock absorbing member 3 and the load transferred to the head of the user. This experiment was conducted in the similar manner to that explained above with reference to FIG. 3B. In this experiment, the samples S had the thickness of 30 mm and the width of 60 mm, but had various lengths. The thickness of 30 mm and the width of 60 mm are the maximum values which do not deteriorate the shock absorbing property of the helmet. From this experiment, it has been confirmed that the length of the transmitter unit 10 should be shorter than 90 mm. Then the load transferred to the user's head can be made less than the threshold value.

Figure 8:
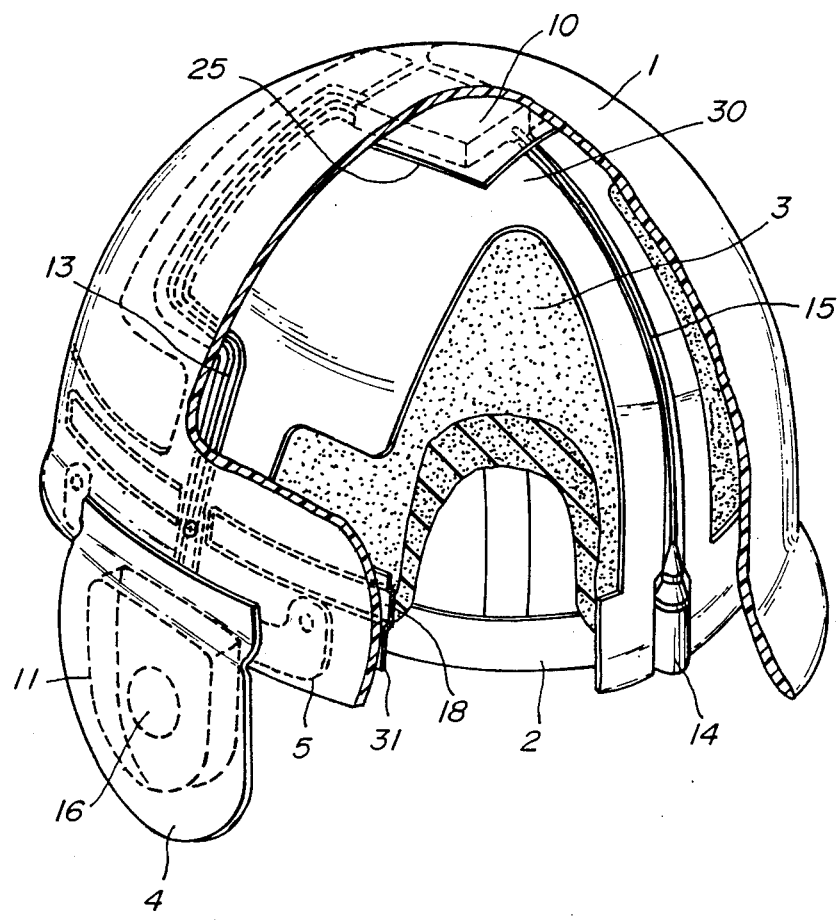
FIG. 8 is a partially cut away perspective view showing another embodiment of the helmet according to the invention.
Figure 9A:
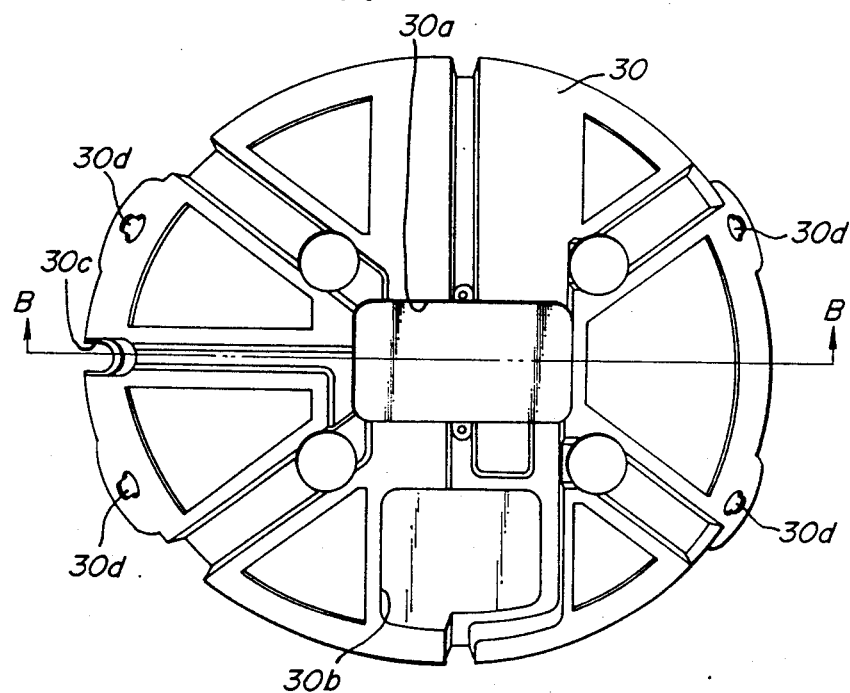
FIG. 9A is a plan view illustrating a holding member shown in FIG. 8.
Figure 9B:
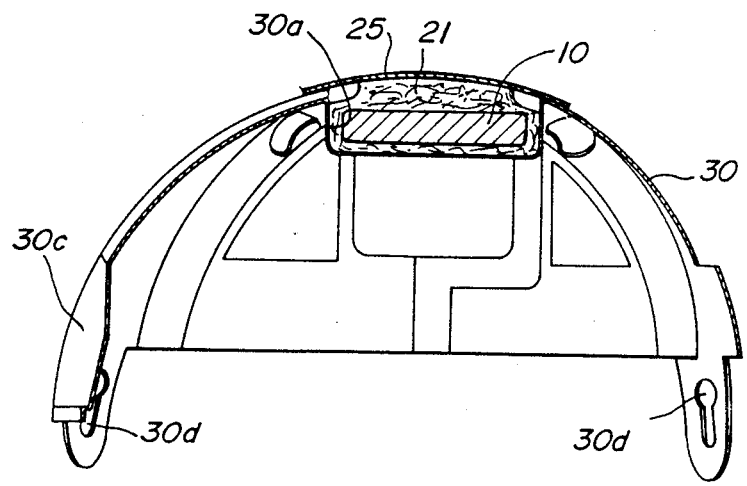
FIG. 9B is a cross sectional view cut along a line B—B in FIG. 9A.

FIG. 8 and FIGS. 9A and 9B illustrate another embodiment of the helmet according to the invention. In this embodiment, portions similar to those shown in the previous embodiment are denoted by the same reference numerals. In this embodiment, various units are provided on a cap-like holding member 30 and the holding member is arranged between a cap-like outer shell 1 and a cap-like shock absorbing member 3. The holding member 30 is made of synthetic resin and has a thickness of about 1 mm. At a top of the cap-like holding member 30 is formed a top recess 30a in which a transmitter unit 10 is installed, and at one side of the holding member 30 is formed a side recess 30b in which a battery unit (not shown) is to be installed. As shown in FIG. 9B, the transmitter unit 10 is inserted into the top recess 30a together with a cushion material 21 and an opening of the top recess is covered with a plastic film 25. In order to reduce the weight of the holding member 30 there are formed openings at portions which are not used for holding the units, conductors and cables. In the present embodiment, transmitting and receiving antennas 17 and 18 are secured to an inner surface of the outer shell 1 with the aid of adhesive tapes 31. In the present embodiment, a microphone 14 having a narrow directional property is clamped into a recess 30c formed in the holding member 30 at its front edge portion. The holding member 30 is fixed to the outer shell 1 by means of rivets which are provided for securing a hammock-like supporting member 2 to the outer shell 1. That is to say, in a lower edge of the holding member 30 are formed holes 30d through which the rivets are projected. In the present embodiment, a receiver unit 11 is secured on an inner surface of an ear-pad member 4 which is secured to the outer shell 1 by means of a fitting member 5.

As explained above in detail, according to the present embodiment, all parts of the two-way communication system except the antennas 17, 18 are not provided on the outer shell 1 and shock absorbing member 3, the outer shell and shock absorbing member can be easily replaced by new ones, when they are damaged by mechanical shock, and irradiation of ultraviolet ray or are stained.

FIG. 10 is a block diagram showing the circuit arrangement of the two-way communication system provided in the helmet according to the invention. The transmitter unit 10 comprises an audio signal amplifier 40 for amplifying an audio signal supplied from the microphone 14 via the conductor 15. The amplified audio signal is then supplied to a frequency modulator 41 to which is also supplied a carrier having a frequency in a range of 300 to 400 MHz from a local oscillator 42. A frequency-modulated signal is further supplied to an output amplifier 43 and an amplified signal is supplied to the transmitting antenna 17 via the coaxial cable. The receiver unit 11 comprises a band pass filter 44 to select a radio frequency signal having a given frequency from electromagnetic energy supplied from the receiving antenna 18 via the coaxial cable. A signal from the band pass filter 44 is supplied to a pre-amplifier 45 and then the amplified signal is supplied to a demodulator 46 to which is supplied from a local oscillator 47 a carrier having a given frequency. A demodulated signal is then amplified by an audio amplifier 48 and the amplified audio signal is supplied to the speaker 16 to reproduce sound.

In the present embodiment, the frequency of the carrier supplied from the local oscillator 42 in the transmitter unit 10 is set to a value which is selected from a range having a center frequency of 440 MHz, whereas the frequency of the carrier supplied from the local oscillator 47 of the receiver unit 11 is set to a value selected from a range having a center frequency of 420 MHz. In this manner, possible interference between helmets can be effectively reduced.

The present invention is not limited to the embodiments explained above, but many modifications and alternations can be easily conceived by those skilled in the art within the scope of the invention.

For instance, the transmitter unit and the receiver unit are formed on printed circuit boards made of glass epoxy, but these units may be further made small by utilizing hybrid IC having a multi layer wiring construction. Further, the substrate may be formed by a flexible plate. In such a case, it is preferable to bend the flexible circuit board in accordance with the curved surface of the helmet. Further, the antenna may be formed by a conductor pattern printed on an insulating sheet. Moreover, the battery unit may be separated from the helmet and may be put in a pocket of a working wear. The speaker may be replaced by an earphone.

Further, the battery may be formed by a solar cell which is provided near a top of the helmet. In such a case a part of the outer shell opposing the solar cell is made of transparent material.

Figure 11A:
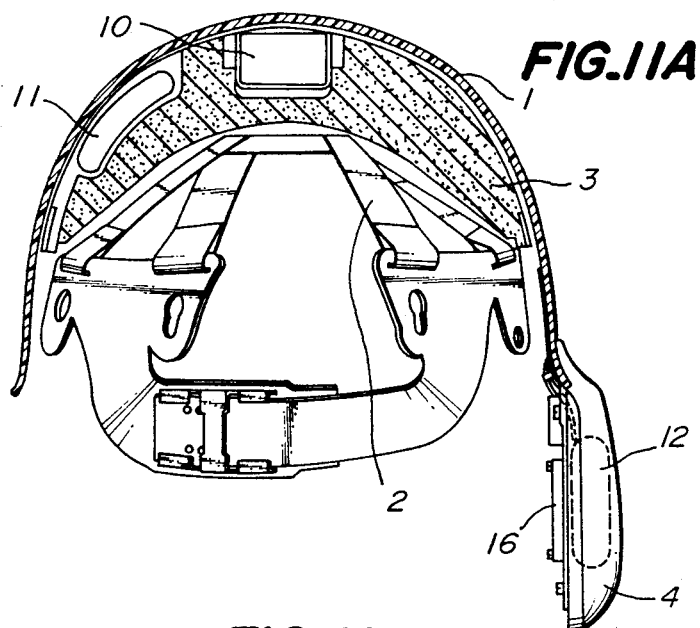
FIG. 11A is a cross sectional view illustrating still another embodiment of the helmet according to the invention.
Figure 11B:
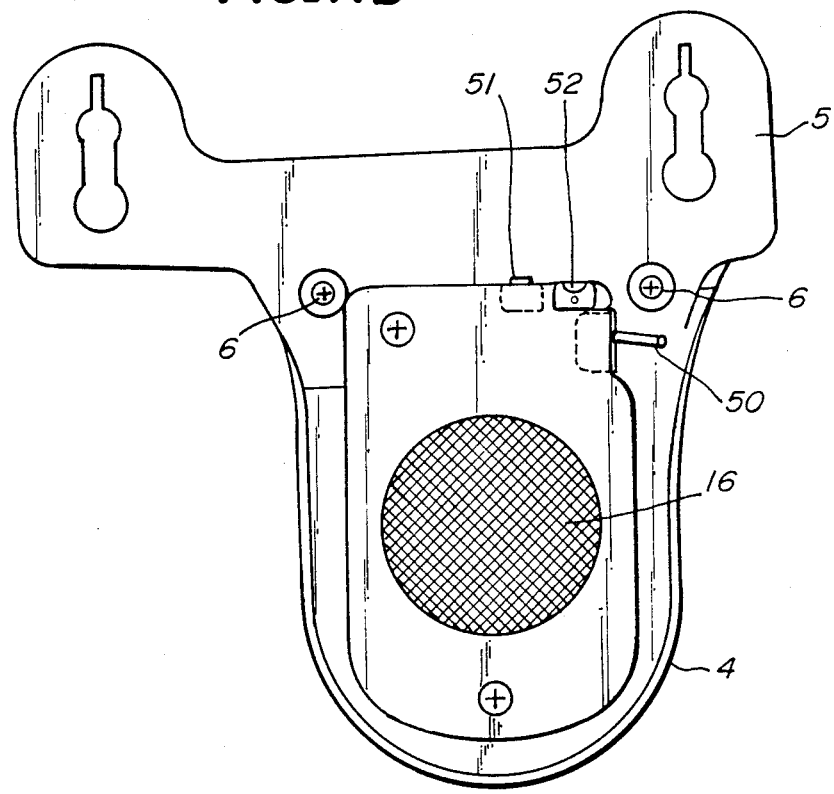
FIG.11B is a rear view of an ear-pad member.

FIGS. 11A and 11B are a cross sectional view and a plan view, respectively showing still another embodiment of the helmet according to the invention. In this embodiment, a transmitter unit 10 and a receiver unit 11 are provided in a top recess and a side recess, respectively formed in an outer surface of a cap-like shock absorbing member 3 which is arranged within a cap-like outer shell 1. A battery unit 12 is installed in an inner space of an ear-pad member 4 secured to the outer shell 1. Within the cap-like shock absorbing member 3 is arranged a hammock-like supporting member 2. In the present embodiment, as illustrated in FIG. 11B, on the inner surface of the ear-pad member 4 are arranged a speaker 16, a power switch 50, a volume control switch 51 and a battery charging jack 52. In this embodiment, since the battery unit 12 is provided in the ear-pad member 4, the batteries can be exchanged easily. This feature is rather important for attaining a security in emergency.

Figure 12:
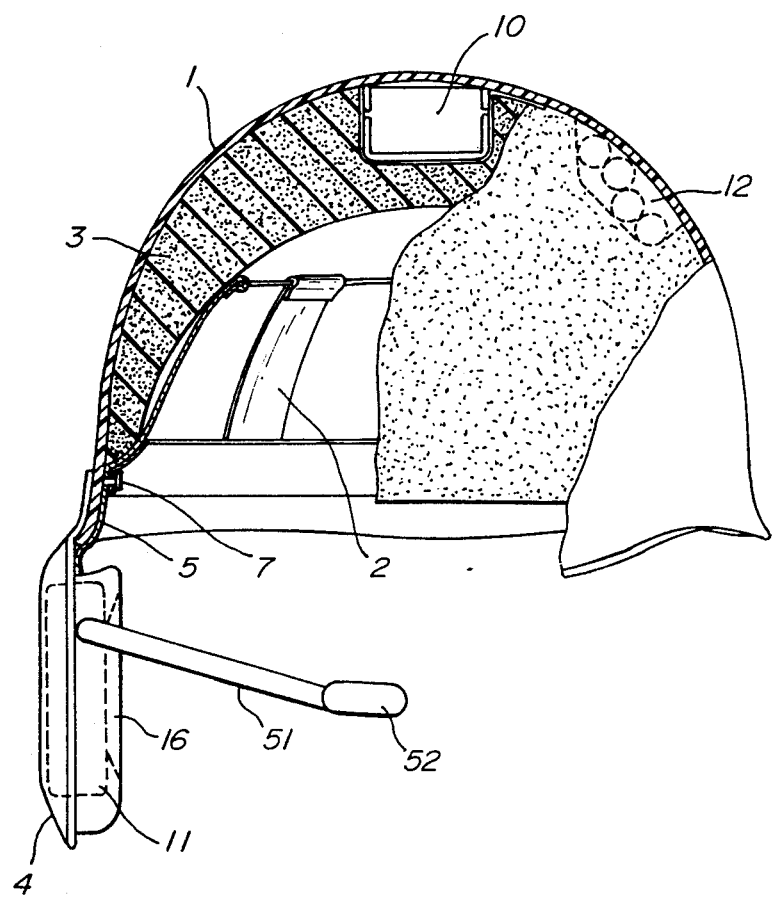
FIG. 12 is a partially cross sectional view depicting still another embodiment of the helmet according to the invention.

FIG. 12 is a partially cross sectional view depicting still another embodiment of the helmet according to the invention. The helmet of this embodiment is different from the previous embodiments in the construction of the microphone, and thus the remaining construction is not explained in detail. In this embodiment, a hollow tube 55 is provided to a receiver unit 11 arranged in an inner space of an earpad member 4 secured to a cap-like outer shell 1. A free end of the hollow tube 55 is extended such that a sound collecting piece 56 situates in front of a mouth of a user who wears the helmet. As shown in FIGS. 13A and 13B, the hollow tube 55 comprises a semiflexible plastic tube 55a and a rubber coating 55b applied on an outer surface of the plastic tube 55a. The sound collecting piece 56 comprises a substantially semicylindrical main body 56a having an opening and a mesh-like member 56b provided at the opening. As shown in FIG. 13A, a small microphone 14 is arranged within the hollow tube 55 near its root portion and an electric conductor connected to the microphone is extended out of the hollow tube to a transmitter unit 10 provided in a top recess of a cap-like shock absorbing member 3 arranged between the outer shell 1 and a hammock-like supporting member 2. A battery unit 12 is fitted in a side recess formed in the outer surface of the shock absorbing member 3.

In the present embodiment, the hollow tube 55 has the excellent electrically insulating property as well as the superior weatherproof property, so that the helmet is particularly advantageous for outside work of electric construction.

Figure 15:
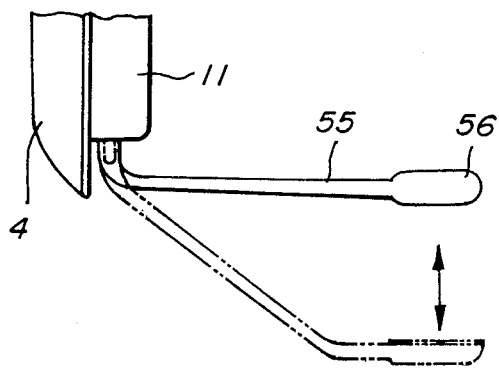
FIG. 15 is a plan view illustrating the movement of the sound collecting means shown in FIG. 12.

FIGS. 14 and 15 show a modified embodiment of the helmet shown in FIG. 12. In the present embodiment, a hollow tube 55 having a sound collecting piece 56 at its free end is secured swingably to a housing 11a of a receiver unit 11 by means of a switch 58. Between the hollow tube 55 and the switch 58 is arranged a coiled spring so that the hollow tube is biased into an upper position shown by a solid line in FIGS. 14 and 15. When the hollow tube 55 is pushed down by the user into a lower position illustrated by a chain line against the force of the coiled spring, the switch 58 is driven into ON condition and the transmitter unit 10 is energized by the battery unit. In this manner, a so-called press-talk communication can be carried out. If the user makes the hollow tube 55 free, the hollow tube is automatically returned into the upper position and the power supply to the transmitter unit 10 is switched off. Therefore, the consumption of the battery energy can be minimized, and possible interference to other communication systems can be effectively prevented. Further, the user can confirm easily the energized condition of the transmitter unit 10 with the aid of the position of the hollow tube 55. Moreover, by keeping the hollow tube 55 at the upper position, the user of the helmet can take a secret conversation with other persons near him. Even in such a case, since the receiver unit 11 is switched on, the user can listen to any communicated message.

In a modified embodiment of the helmet according to the invention the switch 58 serves as a microphone switch connected between the microphone 57 and the transmitter unit.

Figure 16:
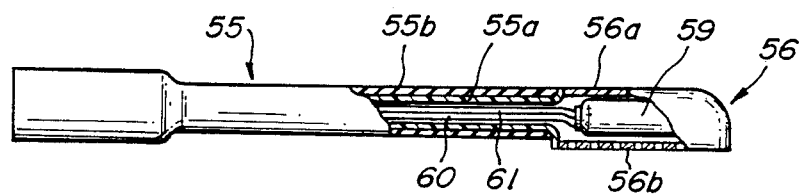
FIG. 16 is a partially cross sectional view depicting another embodiment of the sound collecting means.

FIG. 16 shows another embodiment of the hollow tube according to the invention. In this embodiment, an optical microphone 59 is arranged in a sound collecting piece 56 provided at a free end of a hollow tube 55. Through the hollow tube 55 are extended a pair of optical fiber cables 60 and 61, these cables being connected to a transmitter unit provided in the helmet.

Figure 17:
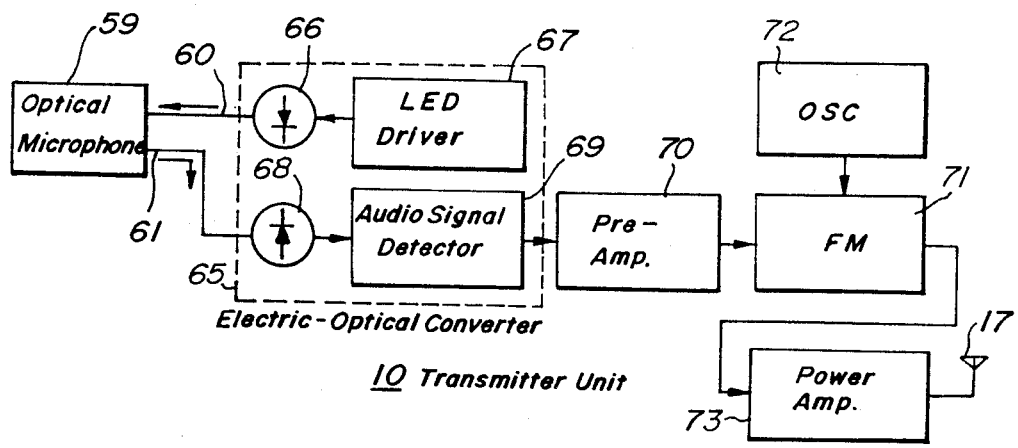
FIG. 17 is a block diagram showing a construction of the transmitter unit.

FIG. 17 is a block diagram illustrating a construction of the transmitter unit 10 of the present embodiment. The transmitter unit 10 comprises an electric-optical converter 65 having a light emitting diode 66, a light emitting diode driver 67, a photodiode 68 and an audio signal detector 69. Light having a constant intensity emitted by the light emitting diode 66 is conducted via the optical fiber cable 60 to the optical microphone 59. In the optical microphone 59, the light intensity is modulated by a sound pressure impinging upon the microphone. The light having the intensity thus modulated is conducted by means of the optical fiber cable 61 to the photodiode 68 which converts the light into an electric signal. The electric signal thus converted is then supplied to the audio signal detector 69 to derive an audio signal. The audio signal is supplied via a pre-amplifier 70 to a frequency modulator 71 to which is also supplied a carrier from a local oscillator 72, so that the carrier frequency is modulated by the audio signal to generate a frequency modulated signal. This signal is transmitted by a transmitting antenna 17 via a power amplifier 73.

In the helmet according to this embodiment, since any electric parts are not provided in the hollow tube 55, the electric insulating property can be enhanced.

Figure 18:
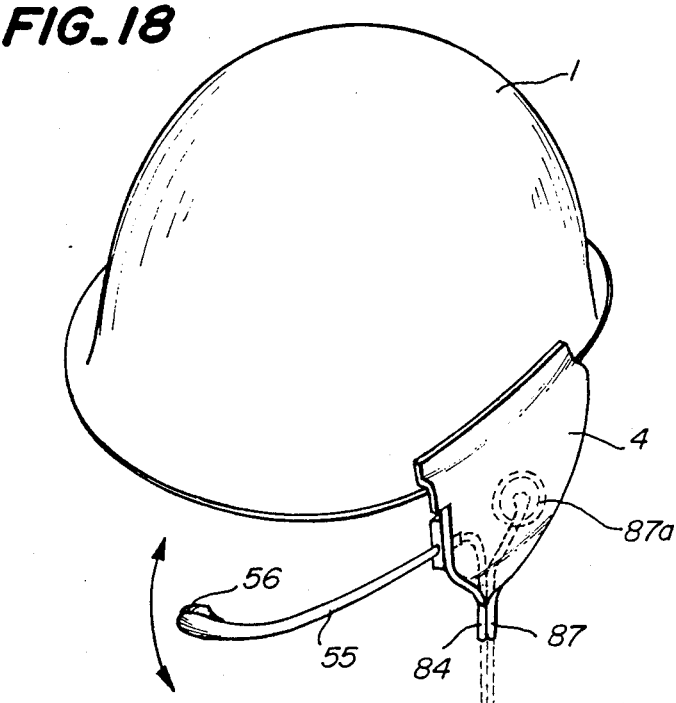
FIG. 18 is a perspective view illustrating an embodiment of the two-way radio communication system according to the invention.
Figure 19:
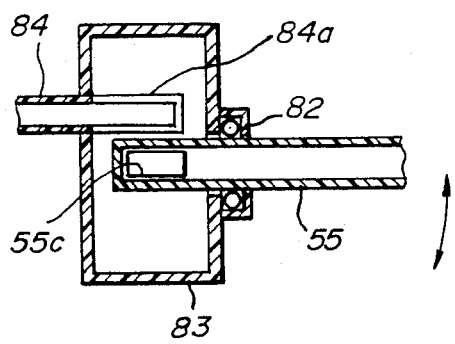
FIG. 19 is a cross sectional view showing a detailed construction of a sound switch provided on an ear-pad member shown in FIG. 18.
Figure 20:
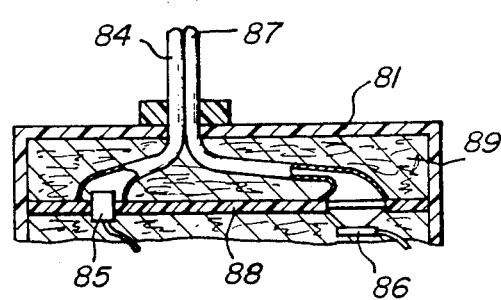
FIG. 20 is a cross sectional view illustrating a means for communicating pipes with microphone and speaker depicted in FIG. 18.

FIGS. 18, 19 and 20 illustrate an embodiment of the two-way radio communication system employing a helmet according to the invention. In the present embodiment, an ear-pad member 4 is secured to a cap-like outer shell 1 of a helmet. A transmitter unit, receiver unit, battery unit and transmitting and receiving antennas are all installed in a housing 81 carried by a user in a pocket or on a belt. To the ear-pad member 4 is secured swingably a hollow tube 55 having a sound collecting piece 56 at its free end. As shown in FIG. 19, a root portion of the hollow tube 55 is supported by a fulcrum-like supporting member 82 provided on a box-like member 83. There is formed an opening 55c in the hollow tube 55 at its root portion. To the box-like member 83 is secured a flexible pipe 84 made of electrically insulating material and having an opening 84a at its end inserted into the box-like member 83. When the hollow tube 55 is pushed downward so that the sound collecting piece 56 faces the mouth of the user, the opening 55c formed in the hollow tube 55 is aligned with the opening 84a formed in the flexible pipe 84. Therefore, sound collected by the sound collecting piece 56 and transmitted through the hollow tube 55 is further transmitted into the flexible pipe 84. The sound thus transmitted through the flexible pipe 84 is made incident upon a microphone 85 provided in the housing 81 and is converted into an audio signal. In the housing 81 there is further provided a small speaker 86 for converting a received audio signal into sound. The sound thus produced by the speaker 86 is transmitted through a second flexible pipe 87 which is made of electrically insulating material and has a cone-like portion 87a provided on the ear-pad member 4. As shown in FIG. 20, the microphone 85 and speaker 86 are secured to a plate 88, and a space surrounding these elements is filled with a sound insulating material 89 so that mutual interference between the microphone and speaker can be suppressed.

In the two-way radio communication system with the helmet according to the present invention, any electric parts are not provided in the helmet, the electric insulating property of the helmet is excellent. Further, when the hollow tube 55 is in the upper position shown in FIG. 19, the openings 55c and 84a are not directly communicated with each other, noise could hardly be transmitted into the flexible pipe 84, and thus other users can be effectively prevented from being annoyed with noise.

In modifications of the two-way radio communication system with a helmet according to the invention, the speaker may be arranged on the inner surface of the ear-pad member and a microphone may be provided in the helmet at its forehead portion. Then, the speaker and microphone may be electrically connected with the housing including the transmitter, receiver and battery units via electric conductors. In this case, the electric conductors are preferably covered with a multi-layer insulator.

What is claimed is:

1. A helmet with two-way radio communication faculty, comprising:
    a cap-like outer shell made of hard and electrically insulating material;
    an ear-pad member made of hard and electrically insulating material and secured to a side edge of said outer shell;
    a cap-like shock absorbing member made of electrically insulating and shock absorbing material, said shock absorbing member being arranged within said outer shell and having a plurality of recesses formed in an outer surface thereof;
    a sound converting means for converting sound into an audio signal;
    a transmitter unit for converting said audio signal into a high frequency signal;
    a transmitting antenna for transmitting said high frequency signal as electromagnetic waves;
    a receiving antenna for receiving electromagnetic waves transmitted from other transmitting antennas to regenerate a high frequency signal therein;
    a receiver unit for receiving said high frequency signal regenerated in said receiving antenna and generating an audio signal;
    a sound reproducing means for receiving said audio signal generated by said receiver unit and reproducing sound; and
    a battery unit for energizing said transmitter unit and receiver unit; whereby one of said transmitter unit, receiver unit and battery unit is provided on an inner surface of said ear-pad member and the remaining units are arranged separately in said recesses formed in the outer surface of the shock absorbing member, and said transmitting antenna and receiving antenna are secured to an inner surface of said outer shell at side portions opposite to each other.

2. A helmet according to claim 1, wherein said shock absorbing member has a top recess formed in the outer surface at its top portion and a side recess formed in the outer surface at its side portion which is opposite to a side portion on which said ear-pad member is secured to said outer shell.

3. A helmet according to claim 2, wherein said receiving unit is arranged on the inner surface of the ear-pad member, said transmitter unit and battery unit are arranged in said top and side recesses, respectively, of the shock absorbing member.

4. A helmet according to claim 2, wherein said battery unit is arranged on the inner surface of the ear-pad member, and said transmitter and receiver units are arranged in said top and side recesses, respectively, of the shock absorbing member.

5. A helmet according to claim 1, wherein said shock absorbing member has grooves formed in the outer surface thereof for accommodating electric wiring means for electrically connecting the battery unit with the transmitter and receiver units.

6. A helmet according to claim 1, further comprising a supporting member provided within said shock absorbing member for supporting the helmet on a head of a user.

7. A helmet according to claim 6, further comprising a fitting member secured to said ear-pad member, said fitting member being coupled with said outer shell with the aid of rivets which are provided for securing said supporting member to the outer shell.

8. A helmet according to claim 1, wherein said sound reproducing means comprises a speaker provided on the inner surface of the ear-pad member.

9. A helmet according to claim 1, wherein said sound converting means comprises a microphone which is clamped into a recess formed in said shock absorbing member at its forehead edge.

10. A helmet according to any one of claims 3 or 4, wherein said shock absorbing member has a thickness of 30 to 55 mm near its top portion and a sum of a distance from the outer surface of the shock absorbing member to an upper surface of the transmitter unit arranged in the top recess and a distance from a bottom of the top recess to an inner surface of the shock absorbing member is set within a range of 9 to 25 mm.

11. A helmet according to claim 10, wherein said transmitter unit provided in the top recess has a width smaller than 60 mm, a length smaller than 90 mm, and a thickness smaller than 30 mm.

12. A helmet according to claim 10, wherein said transmitter unit is arranged in said top recess together with cushion material.

13. A helmet according to claim 10, wherein said transmitter unit is firmly clamped into said top recess such that a bottom surface of the transmitter unit is brought into contact with a bottom surface of the top recess.

14. A helmet according to claim 10, wherein said transmitter unit is placed in a casing and the casing is placed in the top recess.

15. A helmet according to claim 14, wherein said casing has a plurality of leg portions with folded lags and the shock absorbing member has a plurality of ventilation holes through which said lags of leg portions are projected over the inner surface of the shock absorbing member.

16. A helmet according to claim 10, wherein said transmitter unit is placed in the top recess and an opening of the top recess is covered with an adhesive tape made of electrically insulating material.

17. A helmet according to claim 10, wherein a heat-shrinkable film made of electrically insulating plastic material is provided on the outer surface of the shock absorbing member so that the transmitter and battery units and electric conductors are placed in position on the outer surface of the shock absorbing member.

18. A helmet according to claim 1, further comprising a cap-like holding member made of electrically insulating material and having a plurality of recesses corresponding to said plurality of recesses formed in said shock absorbing member, said transmitter, receiver and battery units being arranged in the recesses of the holding member and the holding member being placed on the shock absorbing member such that said recesses of the holding member are fitted in said recesses of the shock absorbing member.

19. A helmet according to claim 1, further comprising a power switch for switching an energy supply to the transmitter and receiver units, said power switch being provided on the inner surface of the ear-pad member.

20. A helmet according to claim 19, wherein said receiver unit comprises a volume control knob provided on the inner surface of the ear-pad member.

21. A helmet according to claim 19, wherein said battery unit comprises at least one rechargeable battery and a battery recharging jack provided on the inner surface of the ear-pad member.

22. A helmet according to claim 1, wherein the transmitter unit is arranged in a top recess formed in the outer surface of the shock absorbing member at its top portion, the receiver unit is arranged on the inner surface of the ear-pad member, said transmitting antenna is provided on the inner surface of the outer shell at its side portion which is remote from said ear-pad member, and said receiving antenna is provided on the inner surface of the outer shell at its side portion on which side portion said ear-pad member is secured to the outer shell.

23. A helmet according to claim 1, wherein each of said transmitting and receiving antennas is formed by a dipole antenna having an antenna length of a half wavelength.

24. A helmet according to claim 23, wherein each of said transmitting and receiving antennas is formed by a metal foil made of a metal selected from a group consisting of copper, aluminum and brass.

25. A helmet according to claim 24, wherein said transmitting and receiving antennas are secured on the inner surface of the outer shell by means of adhesive tapes made of electrically insulating synthetic resin selected from a group consisting of silicone resin, epoxy resin, polyethylene resin and polypropylene resin.

26. A helmet according to claim 23, wherein each of said transmitting and receiving antennas has a ratio of width to length within a range of 0.02 to 0.1.

27. A helmet according to claim 1, wherein said sound converting means comprises a microphone provided on the inner surface of the ear-pad member, a hollow tube made of electrically insulating material and coupled with said ear-pad member at its one end, the other end of the hollow tube being extended near a mouth of a user, and a sound collecting piece made of electrically insulating material and provided at the other end of the hollow tube.

28. A helmet according to claim 27, wherein said hollow tube comprises a semi-flexible tube made of electrically insulating plastics and an insulating rubber coating applied on said semi-flexible tube.

29. A helmet according to claim 27, wherein said hollow tube is secured to the ear-pad member movably between an upper position and a lower position in which the sound collecting piece is faced with the mouth of the user.

30. A helmet according to claim 29, wherein said transmitting unit comprises an on-off switch which is driven to an on-condition by the movement of the hollow tube into said lower position, whereby said transmitter unit is energized when said on-off switch is in the on-condition.

31. A helmet according to claim 31, wherein said on-off switch is formed by a self-return switch which is biased into off-condition.

32. A helmet according to claim 29 further comprises a microphone switch which is driven to an on-condition by the movement of the hollow tube into the lower position.

33. A helmet according to claim 32, wherein said microphone switch comprises a first opening formed in the hollow tube at its root portion, and a fixed pipe having a second opening, said microphone being arranged in said fixed pipe, whereby said first opening of the hollow tube is aligned with said second opening of the fixed pipe when said hollow tube is driven into the lower position.

34. A helmet according to claim 1, wherein said sound converting means comprises a hollow tube having one end secured to the ear-pad member, a sound collecting piece arranged at the other end of the hollow tube, an optical microphone provided in said sound collecting piece, first and second optical fiber cables both extending from said optical microphone to said transmitter unit through said hollow tube, a light source arranged in the transmitter unit for emitting light having a constant intensity, said light being conducted through said first optical fiber cable to said optical microphone, and an audio signal detector arranged in the transmitter unit for receiving light modulated by sound in said optical microphone and transmitted through said second optical fiber cable to detect an audio signal.

35. A helmet according to claim 1, wherein said cap-like outer shell and ear-pad member are made of material selected from a group consisting of polycarbonate, polyethylene, vinyl chloride, epoxy, urethane and fiber reinforced plastics.

36. A helmet according to claim 35, wherein said shock absorbing member is made of foamed polystyrene.

37. A two-way radio communication system with a helmet having a hard and electrically insulating outer shell and a hard and electrically insulating ear-pad member secured to one side edge of the outer shell, comprising:
 a housing means for accommodating a transmitter unit, a receiver unit, a battery unit, a transmitting antenna and a receiving antenna, said battery unit electrically coupled to said transmitter and receiver units, said transmitting antenna and receiving antenna being secured to an inner surface of said outer shell;

a sound reproducing means arranged on an inner surface of the ear-pad member for generating sound;

a sound collecting means secured to the helmet for collecting sound;

a first communication cable means for coupling the sound reproducing means with the receiver unit; and a second communicating cable means for coupling the sound collecting means with the transmitter unit;

wherein said sound collecting means comprises a sound collecting piece and a hollow tube having one end coupled with said sound collecting piece and the other end secured to said ear-pad member, and said second communication cable means comprises a second flexible tube having one end communicated with the other end of said hollow tube and the other end coupled with a microphone provided in said housing means.

38. The system according to claim 37, wherein said sound reproducing means comprises a cone-like portion provided on the inner surface of the ear-pad member and said first communication cable means comprises a first flexible tube having one end electrically connecting said cone-like portion and the other end electrically connecting a speaker provided in said housing means.

39. A system according to claim 37, wherein said hollow tube is secured to the ear-pad member movably between an upper position and a lower position at which said sound collecting piece is faced with a mouth of a user.

40. A system according to claim 39, wherein said sound collecting means further comprises a switching mean for electrically connecting the other end of said hollow tube with the one end of said second flexible tube only when said hollow tube is driven into said lower position.

41. A system according to claim 40, wherein said switching means comprises a first opening formed in said hollow tube at its root portion and a second opening formed in said second flexible tube at its one end, whereby said first opening is aligned with said second opening when said hollow tube is driven into said lower position.

* * * * *